(12) United States Patent
Talcott

(10) Patent No.: US 6,272,623 B1
(45) Date of Patent: Aug. 7, 2001

(54) METHODS AND APPARATUS FOR BRANCH PREDICTION USING HYBRID HISTORY WITH INDEX SHARING

(75) Inventor: Adam R. Talcott, San Jose, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/236,081

(22) Filed: Jan. 25, 1999

(51) Int. Cl.[7] .................................................. G06F 9/38
(52) U.S. Cl. ................................... 712/239; 712/240
(58) Field of Search ................................... 712/239, 240

(56) References Cited

U.S. PATENT DOCUMENTS

| | | | |
|---|---|---|---|
| 5,553,253 | * | 9/1996 | Pan et al. ........................... 712/240 |
| 5,687,360 | * | 11/1997 | Chang .................................. 712/240 |
| 5,758,142 | * | 5/1998 | McFarling et al. ................. 712/239 |
| 5,901,307 | * | 5/1999 | Potter et al. ........................ 712/240 |
| 5,935,241 | * | 8/1999 | Shiell et al. ........................ 712/240 |

OTHER PUBLICATIONS

David A. Patterson and John L. Hennessy, Computer Organization & Design 436–516 (Morgan Kaufmann Publishers, Inc., 1988).

* cited by examiner

*Primary Examiner*—Kenneth S. Kim
(74) *Attorney, Agent, or Firm*—Finnegan, Henderson, Farabow, Garrett & Dunner, L.L.P.

(57) ABSTRACT

A branch prediction scheme predicts whether a computer instruction will cause a branch to a non-sequential instruction. A prediction counter is selected by performing an exclusive or (XOR) operation between bits from an instruction address and a hybrid history. The hybrid history, in turn, is derived by concatenating bits from a global history register with bits from a local branch history table. The bits from the local branch history table are accessed by using bits from the instruction address.

11 Claims, 5 Drawing Sheets

METHODS AND APPARATUS FOR BRANCH PREDICTION USING HYBRID HISTORY WITH INDEX SHARING

BACKGROUND OF THE INVENTION

A. Field of the Invention

The invention generally relates to computer architecture, and, more particularly, to branch prediction.

B. Description of the Related Art

Modern high performance computer processors typically employ pipelining to increase performance. "Pipelining" refers to a processing technique in which multiple sequential instructions are executed in an overlapping manner. A general description of pipelining can be found in "Computer Organization & Design" by David A. Patterson and John L. Hennessy (2d ed. 1988, pp. 436–516).

FIG. 1 shows the timing of instruction processing in a conventional five-stage pipeline processor architecture. With such an architecture, the processor can simultaneously process different stages of up to five successive instructions. The five stages shown in FIG. 1 are: IF (instruction fetch), ID (instruction decode), EX (execute instruction), MEM (memory access), and WB (write back to register).

For example, at clock cycle 1, the processor fetches instruction I1. At clock cycle 2, the processor decodes instruction I1 and fetches instruction I2. In the same manner, the processor continues to process instructions as they are received; by clock cycle 5, the processor writes back the result of instruction I1, accesses memory for instruction I2, executes instruction I3, decodes instruction I4, and fetches instruction I5. In contrast, a non-pipelined architecture would complete processing of an entire instruction (e.g. instruction I1) before beginning to process the next instruction (e.g., instruction I2).

When program flow is perfectly sequential, a pipelined architecture can achieve significant performance advantages over non-pipelined architecture. In actual programs, however, approximately twenty percent of program instructions are branches. Branch instructions cause a program to deviate from a sequential flow. Consequently, the instruction to be executed (the target of the branch) may not be the next instruction in the fetch sequence.

A processor may recognize that an instruction is a branch instruction in the IF stage (the first stage of the five-stage pipeline). For conditional branch instructions, however, the processor typically cannot determine whether the branch should be taken until it reaches the EX stage (the third stage of the five-stage pipeline). By this time, the processor has already fetched and begun processing the next two instructions. The processing of those two instructions is wasted and inefficient if the branch instruction redirects program flow to another location.

Referring to FIG. 1, if instruction I1 is a conditional branch instruction that redirects flow to instruction I6, the processor does not recognize this until clock cycle 3 (EX), when the processor is executing instruction I1. By this time, the processor has already fetched instruction I2 during clock cycle 2, and decoded instruction I2 and fetched instruction I3 during clock cycle 3. This processing of instructions I2 and I3 is wasted, however, because branch instruction I1 causes flow to skip to instruction I6, with no further processing of instructions I2 or I3. Moreover, the branching causes a stall in the pipeline while the correct instruction (I6) is fetched. These inefficiencies caused by branches become exacerbated when deeper pipelines or superscalar processors are used because it takes longer to resolve a branch.

One approach to solving this problem, called branch prediction, involves making accurate, educated determinations about whether an instruction will result in a branch to another location. Branch prediction is premised on the assumption that, under similar circumstances, the outcome of a conditional branch will likely be the same as prior outcomes. Because branch prediction can be implemented in the IF stage of processing, there is no wasted instruction processing if the result of the conditional branch is always predicted correctly.

Conventional branch prediction techniques include correlation-based schemes and global branch history with index sharing ("gshare"). Although these techniques are somewhat effective, the frequency of erroneous prediction using these techniques may be unacceptable. There remains, therefore, a need for a branch prediction scheme that reduces the frequency of erroneous prediction.

SUMMARY OF THE INVENTION

In accordance with the invention, as embodied and broadly described herein, a method of predicting whether a branch will be taken involves reading bits from a local history table and concatenating them with bits from a global history register. The result of the concatenation is combined with bits from the instruction address by performing an exclusive or operation. The result of the exclusive or operation is used to read a branch prediction table.

In accordance with the invention, an apparatus for predicting whether a branch will be taken comprises a local history table and a global history register. The local history table and the global history table are connected to inputs of a concatenating circuit. The output of the concatenating circuit is connected to one input of an exclusive or circuit, with an instruction address source being connected to another input. The output of the exclusive or circuit is connected to an input of a branch prediction table.

It is to be understood that both the foregoing general description and following detailed description are intended only to exemplify and explain the invention as claimed.

BRIEF DESCRIPTION OF THE DRAWINGS

The accompanying drawings, which are incorporated in and constitute a part of this specification, illustrate embodiments of the invention and, together with the description, serve to explain the advantages and principles of the invention. In the drawings.

DETAILED DESCRIPTION

The invention will now be described in reference to the accompanying drawings. The same reference numbers may be used throughout the drawings and the following description to refer to the same or like parts.

A. Overview

Methods and apparatus consistent with the invention predict whether an instruction will cause a branch to a non-sequential instruction. This is achieved by incorporating features of the correlation-based and gshare schemes to obtain a scheme consistent with the invention. In particular, a prediction counter is selected by performing an exclusive or (XOR) operation between (i) a specified number of bits from an instruction address and (ii) a hybrid history. The hybrid history, in turn, is derived by concatenating (i) a specified number of bits from a global history register with (ii) a specified number of bits from a local branch history table. The bits from the local branch history table are accessed by using a specified number of bits from the instruction address.

B. Architecture

Figure 1:
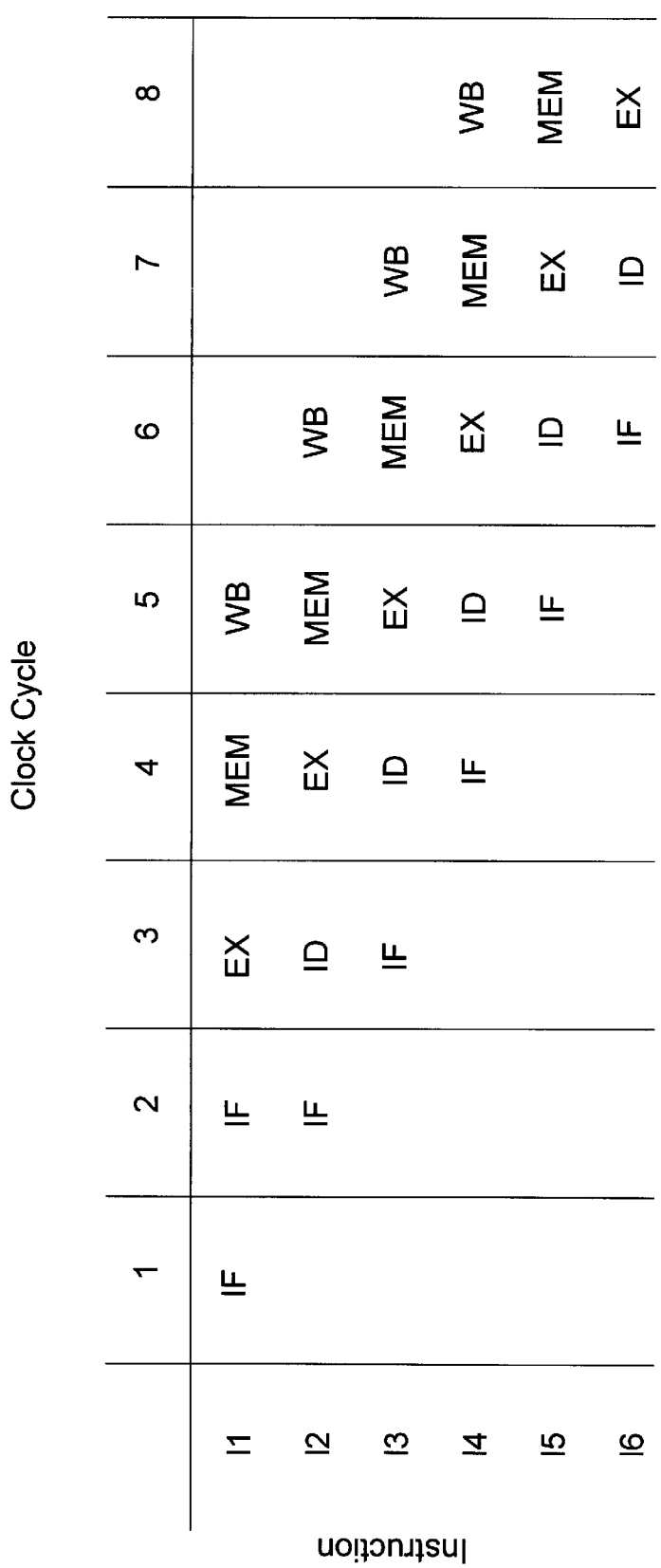
FIG. 1 shows the timing of instruction processing in a conventional five-stage pipeline processor architecture.
Figure 2:
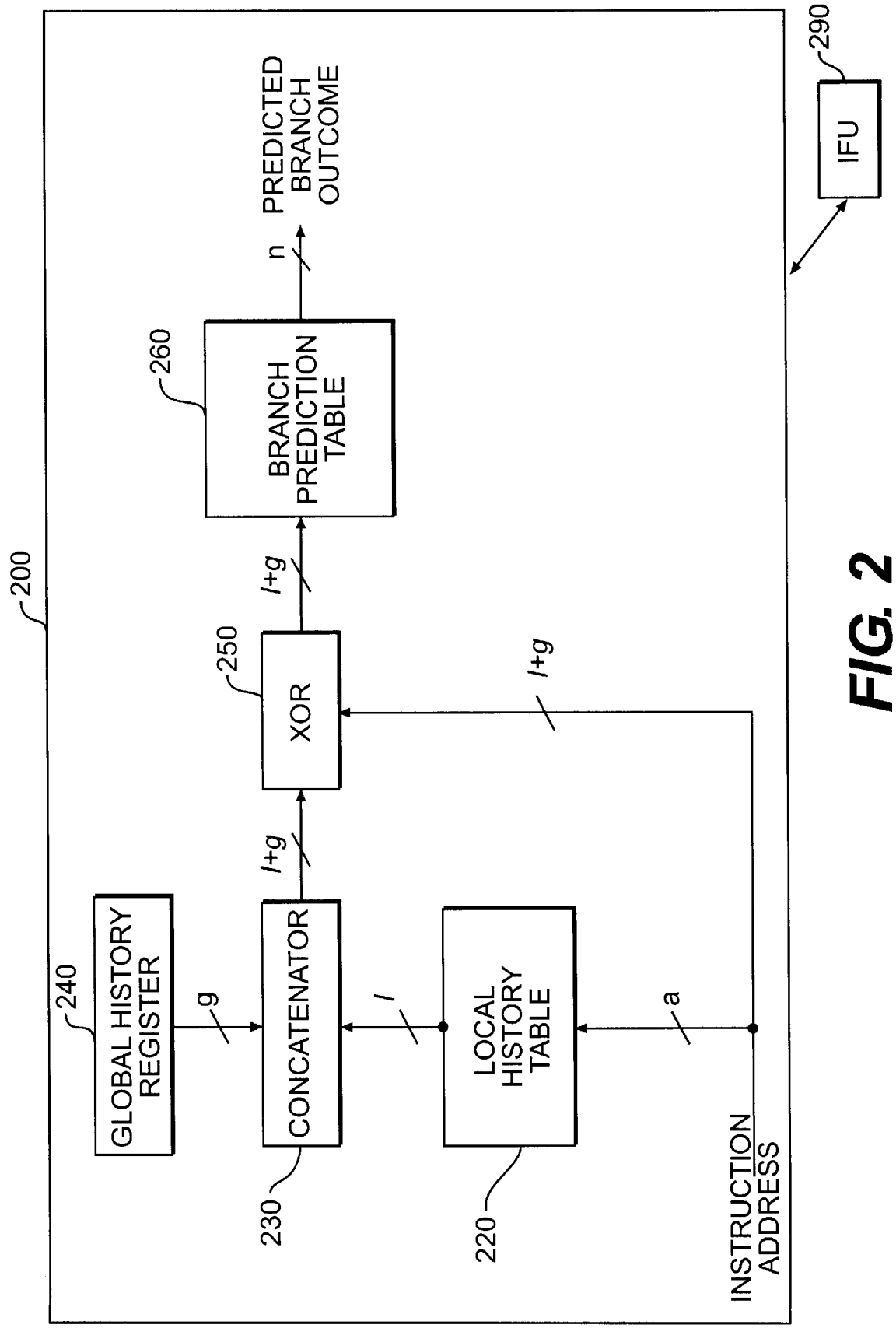
FIG. 2 is a block diagram depicting a first system for branch prediction, consistent with the invention.

FIG. 2 is a block diagram depicting one system of branch prediction, consistent with the invention. In a preferred embodiment, system 200 includes the following components: local history table 220, concatenator 230, global history register 240, XOR 250, and branch prediction table 260. System 200 may be controlled and accessed by an instruction fetch unit ("IFU") 290.

Local history table 220 is connected to concatenator 230 via a data path that is preferably l bits wide. Global history register 240 is also connected to concatenator 230 via a data path that is preferably g bits wide. Concatenator 230 is connected to XOR 250 via a data path that is preferably l+g bits wide. XOR 250 is connected to branch prediction table 260 via a data path that is preferably l+g bits wide.

Local history table 220 is a device storing local history data and preferably comprises $2^a$ shift registers, each having at least l bits. Alternatively, local history data may be stored in any type of memory, such as a single register, multiple registers, or random access memory. Each register stores the l most recent conditional outcomes for a set of instruction addresses that each have the same a address bits in common. When an instruction in this set results in a branch being taken, a value of 1 is shifted into the corresponding register. In contrast, a value of 0 is shifted into the corresponding register if a branch is not taken. Data that corresponds to branch history on a local level is hereinafter called "local branch history data."

Global history register 240 preferably comprises a shift register having at least g bits. These bits represent the g most recent outcomes for any branch instruction, conditional or not, and regardless of its address. When a branch is taken, a value of 1 is shifted into global history register 240. In contrast, a value of 0 is shifted into global history register 240 when a branch is not taken. Data that corresponds to branch history at a global level is hereinafter called "global branch history data."

Concatenator 230 is a device that receives g bits from global history register 240 and l bits from local history table 220, and concatenates them together to form an output having l+g bits. XOR 250 is a device that receives two inputs each having l+g bits, performs an exclusive or (XOR) operation between the two inputs on a bit-by-bit basis, and creates an output having l+g bits.

Branch prediction table 260 is a device storing branch prediction data and may be implemented using a plurality of n-bit saturating counters. Each of these counters stores data representing whether a branch was taken under a particular circumstance. A circumstance may be defined by the input to branch prediction table 260, which in system 200 may be based on the values of the instruction address, the global history register, and the local history register. For a particular circumstance, if a branch is taken, the value of the corresponding counter is incremented; if the counter value is already at its maximum value, it remains there. If, on the other hand, a branch is not taken, the value of the counter corresponding to that circumstance is decremented; if the counter value is already at its minimum value, it remains unchanged.

These n-bit saturating counters are the basis for the branch prediction decision. For a particular circumstance, if a branch was previously taken (indicated by the counter having a designated value), system 200 predicts that the branch will be taken again. In a preferred embodiment, system 200 predicts that the branch will be taken if the most significant bit of the n-bit counter equals "1".

In one embodiment, a=14, l=4, g=12, and n=2. Other values for these variables can also be used. For example, in another embodiment, a=14, l=2, g=14, and n=2.

Figure 3:
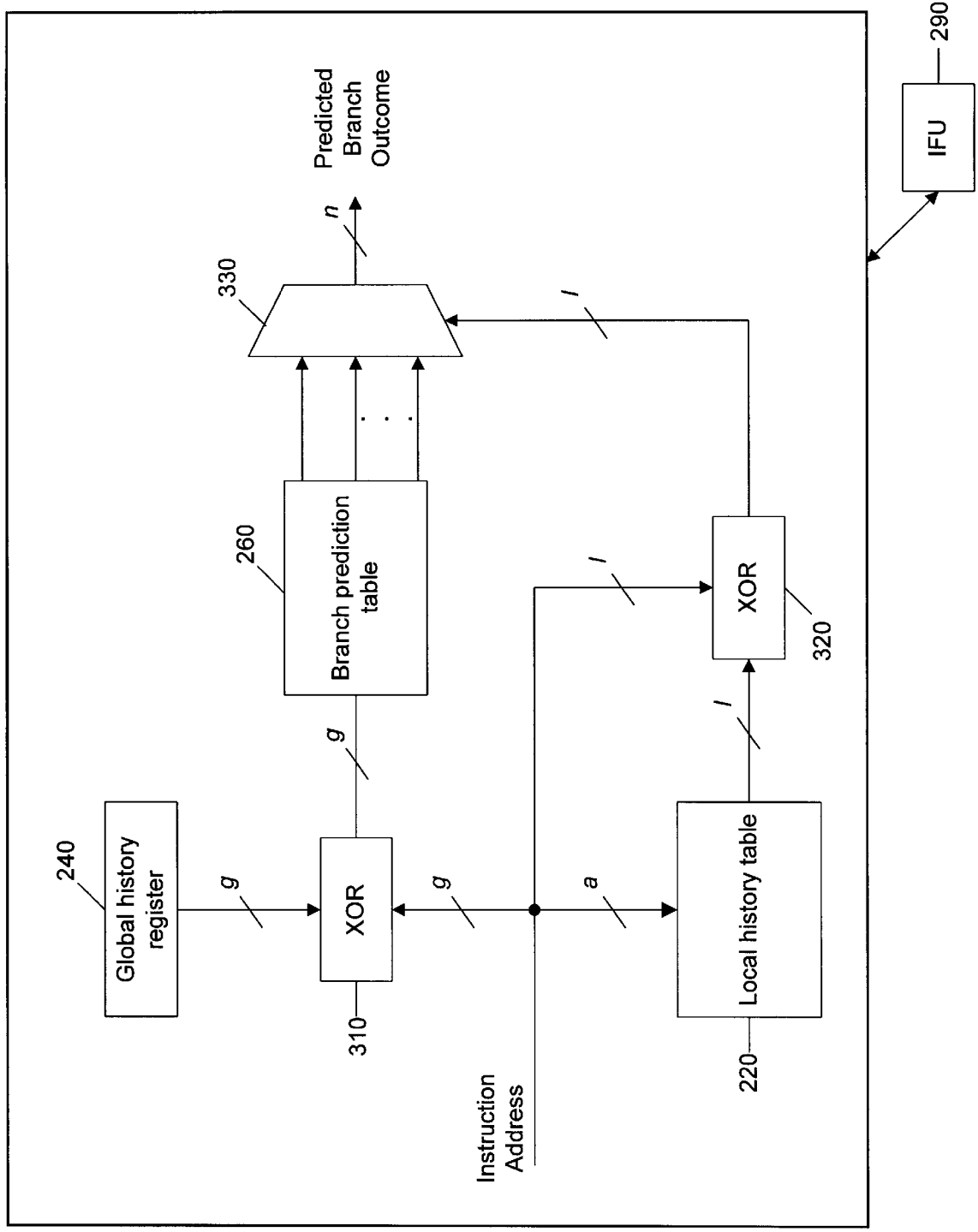
FIG. 3 is a block diagram depicting a second system for branch prediction, consistent with the invention.

FIG. 3 is block diagram depicting another system of branch prediction, consistent with the present invention. In a preferred embodiment, system 300 includes the following components: local history table 220, global history register 240, branch prediction table 260, XOR 310, XOR 320, and column decode multiplexer 330. System 300 may be controlled and accessed by IFU 290.

Global history register 240 is connected to XOR 310 via a data path that is preferably g bits wide. XOR 310 is connected to branch prediction table 260 via a data path that is preferably g bits wide. Branch prediction table 260 is connected to multiplexer 330 via $2^l$ data paths that are preferably n bits wide. The select line of multiplexer 330 is connected to XOR 320 via a data path that is l bits wide. XOR 320 is connected to local history table 320 via a data path that is l bits wide.

XOR 310 is a device that receives two inputs that are g bits wide, performs an XOR operation on them on a bit-by-bit basis, and generates an output that is also g bits wide. Similarly, XOR 320 is a device that receives two inputs that are l bits wide, performs an XOR operation on them on a bit-by-bit basis, and generates an output that is also l bits wide. Multiplexer 330 receives $2^l$ inputs that are n-bits wide. In response to a control signal from XOR 320, multiplexer 330 passes along one of the $2^l$ inputs. The system shown in FIG. 3 may use the same values for variables a, l, g, and n as stated above in reference to FIG. 2.

Systems 200 and 300 described in reference to FIGS. 2 and 3 may be implemented as an integrated circuit as part of one or more computer processors. Alternatively, systems 200 and 300 may be implemented in discrete logic components or software and may be implemented separate from a processor.

C. Architectural Operation

Figure 4:
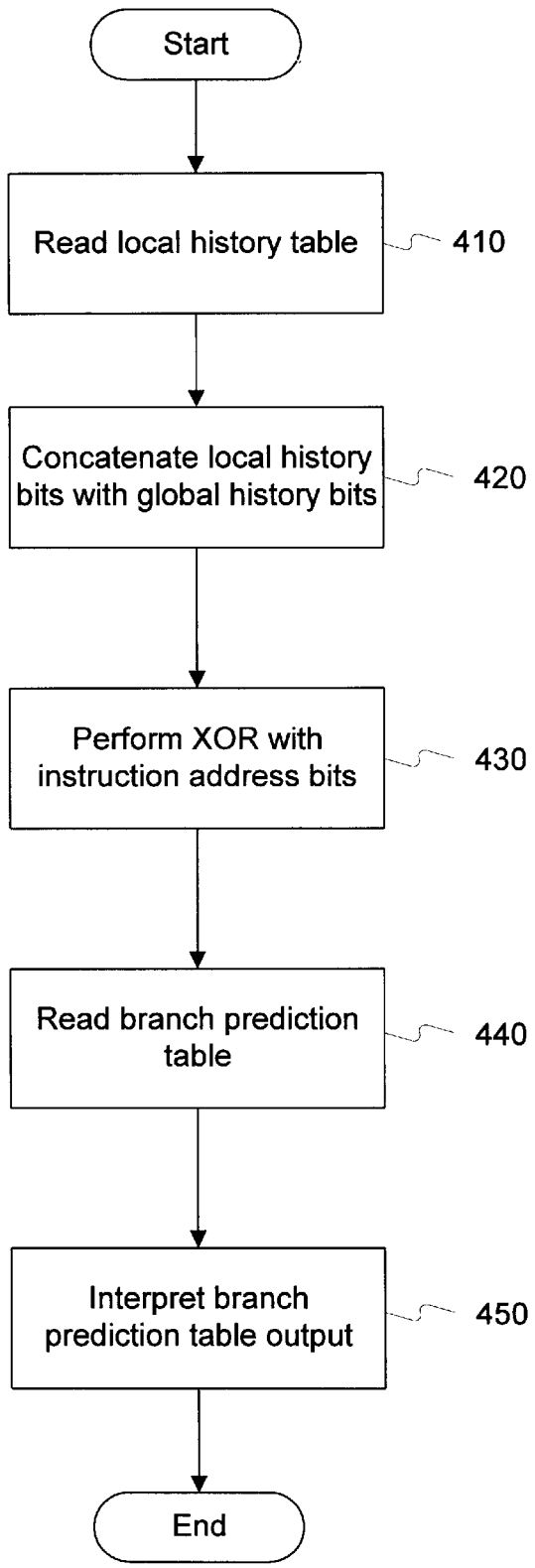
FIG. 4 is a flow diagram of steps performed to predict whether a branch will be taken, consistent with the invention.

FIG. 4 is a flow diagram of a process consistent with the invention, and is described with reference to system 200 shown in FIG. 2.

The process begins with IFU 290 reading local history table 220 (step 410). Specifically, IFU uses bits a+1:2 of the instruction address to access local history data from local history table 220. As used herein, the terminology "m:n" denotes bits m through n, inclusive. In a preferred embodiment, these bits correspond to the a least significant bits of the instruction address excluding the last two bits. The last two bits are preferably excluded because they are typically zero in a processor that employs byte addressing and 32-bit instructions. By accessing local history table 220, IFU 290 causes it to generate an output that is at least l bits wide.

Those of skill in the art will recognize that the invention is not limited to using a portion of the instruction address to access the local history table. For example, the local history table could instead be accessed based upon an address that corresponds to a group of instructions.

Concatenator 230 concatenates the l-bit output from local history table 220 with g bits from global history register 240 (step 420). The output of concatenator 230 may be referred to as either concatenated history data or a hybrid history. XOR 250 performs an XOR operation between the l+g bits output by concatenator 230 and l+g+1:2 bits from the instruction address (step 430). These l+g+1:2 bits correspond to the l+g least significant bits of the instruction address, preferably excluding the last two bits.

IFU 290 uses the l+g bits resulting from the XOR operation to read branch prediction table 260 (step 440). In response, branch prediction table 260 generates an output that is n bits wide. IFU 290 then interprets this n-bit output to predict whether a branch will occur (step 450). Specifically, if the n-bit counter indicates that a branch was taken previously under similar circumstances, then a prediction is made that the branch will again be taken.

Figure 5:
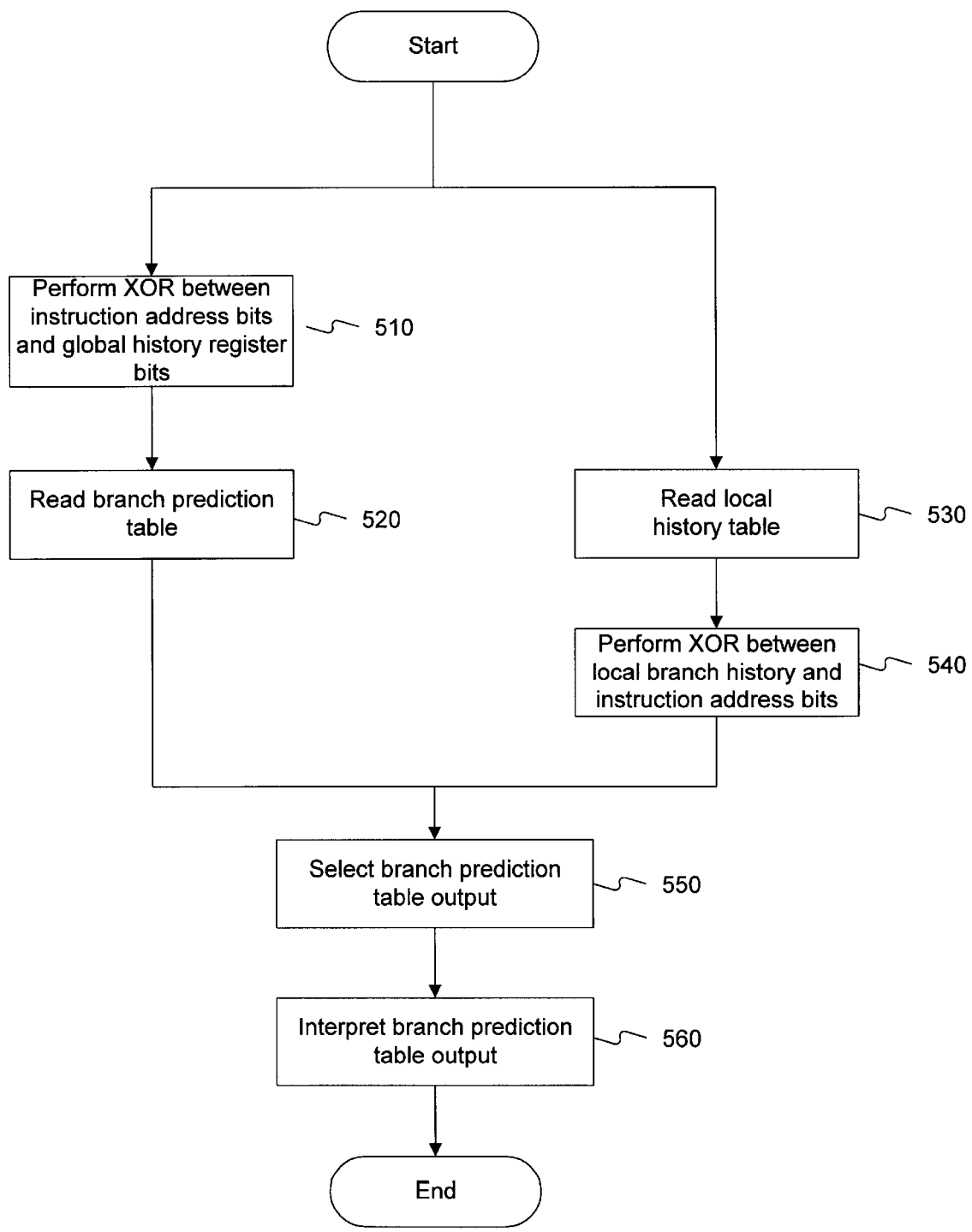
FIG. 5 is another flow diagram of steps performed to predict whether a branch will be taken, consistent with the invention.

FIG. 5 is a flow diagram of another process consistent with the invention. The process shown in FIG. 5 is described with reference to system 300, shown in FIG. 3. The process begins with XOR 310 performing an XOR operation between g bits from global history register 240 and l+g−3:1+2 bits from the instruction address (step 510). These l+g−3:1+2 bits correspond to the same portion of the instruction address that is used in the XOR operation with the global history portion of the hybrid history in FIG. 2. IFU 290 uses this g-bit output from exclusive or 310 as an input to read branch prediction table 260 (step 520). In response, branch prediction table 260 generates $2^l$ outputs that are each n-bits wide. These outputs are fed as inputs to multiplexer 330.

Concurrent with the read of branch prediction table 260, the system performs a read of local history table 220 (step 530). Specifically, IFU 290 reads local history table 220 via bits a+1:2 of the instruction address; the last two bits are preferably excluded as discussed above in connection with the process shown in FIG. 3. In response to this read operation, local history table 220 generates an output that is l bits wide. XOR 320 performs an XOR operation between this l-bit output and bits l+1:2 from the instruction address (step 540). Again, the last two bits are preferably excluded. This creates an output from exclusive or 320 that is l-bits wide.

IFU 290 uses the l-bit output from exclusive or 320 as a "select" input to multiplexer 330. In response, multiplexer 330 generates an n-bit output equivalent to one of the $2^l$ outputs of branch prediction table 260 (step 550). IFU 290 then interprets this n-bit output to predict whether or not a branch will occur (step 560). Specifically, if the most significant bit of n-bit counter indicates that a branch was taken previously under similar circumstances, then a prediction is made that the branch will again be taken. In a preferred embodiment, if the most significant bit of n-bit counter equals "1", then a prediction is made that the branch will again be taken.

D. Conclusion

As described in detail above, methods and apparatus consistent with the present invention predict whether a branch will be taken. The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the data paths between the various components may be in the form of integrated circuit connections, wires, or fiber optics, to name a few. Similarly, although the description above is based on a processor that employs byte addressing and 32-bit instructions, a similar approach could be employed with other addressing schemes. Moreover, the description above is based on a single-processor pipeline architecture, but the invention may be used in a multiple processor environment and non-pipeline processor environments. Furthermore, although the description above employs an XOR function, other hashing functions could be used consistent with the invention. The scope of the invention is defined by the claims and their equivalents.

What is claimed is:

1. A method of predicting whether processing of an instruction is to result in branching of program flow, comprising:

accessing local branch history data;

accessing global branch history data;

concatenating the accessed local branch history data with the accessed global branch history data to form concatenated history data;

performing an exclusive or operation between the concatenated history data and bits from the address of the instruction to form an index to branch prediction data; and generating branch prediction data based upon the index.

2. The method of claim 1, further comprising interpreting the branch prediction data to determine whether a branch will be taken.

3. The method of claim 1, further comprising updating the global branch history data based upon whether a branch is taken.

4. The method of claim 1, further comprising updating the local branch history data based upon whether a branch is taken.

5. A method of predicting whether processing of an instruction is to result in branching of program flow, comprising:

accessing global branch history data;

performing a first exclusive or operation between the accessed global branch history data and bits from the address of the instruction to form index data;

accessing local branch history data;

performing a second exclusive or operation between the accessed local branch history data and bits from the address of the instruction to form select data;

accessing branch prediction data based upon the index data; and selecting at least one of the branch prediction data based upon the select data.

6. A method of predicting whether processing of an instruction is to result in branching of program flow, comprising:

reading local branch history data from a local history table;

reading global branch history data from a global history register;

concatenating the read local branch history data with the read global branch history data to form concatenated history data;

performing an exclusive or operation between the concatenated history data and bits from the address of the instruction to form an index to branch prediction data; and reading branch prediction data from a branch prediction table based upon the index.

7. A method of predicting whether processing of an instruction is to result in branching of program flow, comprising:

reading global branch history data from a global history register;

performing a first exclusive or operation between the read global branch history data and bits from the address of the instruction to form index data;

reading local branch history data from a local history table;

performing a second exclusive or operation between the read local branch history data and bits from the address of the instruction to form select data;

reading branch prediction data from a branch prediction table based upon the index data; and selecting at least one of the branch prediction data based upon the select data.

8. An apparatus for predicting whether processing of an instruction is to result in branching of program flow, comprising:

means for accessing local branch history data;

means for accessing global branch history data;

means for concatenating the accessed local branch history data with the accessed global branch history data to form concatenated history data;

means for performing an exclusive or operation between the concatenated history data and bits from the address of the instruction to form an index to branch prediction data; and means for generating, branch prediction data based upon the index.

9. An apparatus for predicting whether processing of an instruction is to result in branching of program flow, comprising:

means for accessing global branch history data;

means for performing a first exclusive or operation between the accessed global branch history data and bits from the address of the instruction to form index data;

means for accessing local branch history data;

means for performing a second exclusive or operation between the accessed local branch history data and bits from the address of the instruction to form select data;

means for accessing branch prediction data based upon the index data; and means for selecting at least one of the branch prediction data based upon the select data.

10. An apparatus for predicting whether processing of an instruction is to result in branching of program flow, comprising:

means for reading local branch history data from a local history table;

means for reading global branch history data from a global history register;

means for concatenating the read local branch history data with the read global branch history data to form concatenated history data;

means for performing an exclusive or operation between the concatenated history data and bits from the address of the instruction to form an index to branch prediction data; and means for reading branch prediction data from a branch prediction table based upon the index.

11. An apparatus for predicting whether processing of an instruction is to result in branching of program flow, comprising:

means for reading global branch history data from a global history register;

means for performing a first exclusive or operation between the read global branch history data and bits from the address of the instruction to form index data;

means for reading local branch history data from a local history table;

means for performing a second exclusive or operation between the read local branch history data and bits from the address of the instruction to form select data;

means for reading branch prediction data from a branch prediction table based upon the index data; and means for selecting at least one of the branch prediction data based upon the select data.

* * * * *